(12) United States Patent
Odate et al.

(10) Patent No.: US 7,905,313 B2
(45) Date of Patent: Mar. 15, 2011

(54) VEHICLE SEAT-BELT DEVICE AND CONTROL METHOD THEREOF

(75) Inventors: Shotaro Odate, Utsunomiya (JP); Yukihiro Fujiwara, Utsunomiya (JP); Yasushi Shoda, Utsunomiya (JP); Mitsuharu Kanaboshi, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 183 days.

(21) Appl. No.: 12/107,421

(22) Filed: Apr. 22, 2008

(65) Prior Publication Data
US 2008/0264710 A1 Oct. 30, 2008

(30) Foreign Application Priority Data

Apr. 27, 2007 (JP) ................. 2007-119456

(51) Int. Cl.
*B60R 21/0134* (2006.01)
*B60R 22/46* (2006.01)
(52) U.S. Cl. ......... 180/268; 180/282; 180/275; 180/274; 180/271; 280/806; 701/45; 342/71; 342/72
(58) Field of Classification Search ................. 180/268, 180/282, 275, 274, 271; 280/806; 342/71, 342/72; 701/45
See application file for complete search history.

(56) References Cited

U.S. PATENT DOCUMENTS

| | | | |
|---|---|---|---|
| 5,948,961 A * | 9/1999 | Asano et al. ........................ 73/9 |
| 7,388,513 B2 * | 6/2008 | Kubo ............................ 340/903 |
| 2001/0054816 A1 * | 12/2001 | Brambilla et al. ............. 280/806 |
| 2003/0149530 A1 * | 8/2003 | Stopczynski ................. 701/301 |
| 2004/0030499 A1 | 2/2004 | Knoop et al. |
| 2005/0107938 A1 | 5/2005 | Wetzel et al. |
| 2006/0065466 A1 * | 3/2006 | Nishikaji ...................... 180/268 |
| 2006/0097504 A1 | 5/2006 | Akaba et al. |
| 2006/0097570 A1 * | 5/2006 | Doerr et al. ................... 303/193 |

FOREIGN PATENT DOCUMENTS

| | | |
|---|---|---|
| DE | 102004057603 | 4/2006 |
| EP | 1529718 | 5/2005 |
| EP | 1586490 A1 | 10/2005 |
| JP | 2005-41463 | 2/2005 |

\* cited by examiner

*Primary Examiner* — Ruth Ilan
*Assistant Examiner* — Keith Frisby
(74) *Attorney, Agent, or Firm* — Rankin, Hill, Clark LLP

(57) ABSTRACT

A vehicle seat-belt apparatus including: a forward monitoring device which conducts monitoring to the front of a vehicle; an avoidance assist device which supports a predetermined avoidance operation in order to avoid an obstacle when it is determined that there is an obstacle to be avoided based on a detection result of the forward monitoring device; a motor which conducts a rotary driving of a belt reel on which a belt is wound; and a control device which controls the motor, wherein the control device conducts a drive control of the motor according to a state of support of the avoidance operation by the avoidance assist device.

11 Claims, 10 Drawing Sheets

VEHICLE SEAT-BELT DEVICE AND CONTROL METHOD THEREOF

BACKGROUND OF THE INVENTION

Priority is claimed on Japanese Patent Application No. 2007-119456, filed Apr. 27, 2007, the contents of which are incorporated herein by reference.

FIELD OF THE INVENTION

This invention relates to a vehicle seat-belt device and control method thereof.

DESCRIPTION OF RELATED ART

Seat belt devices provided as passenger protection devices in vehicles have heretofore been known. In recent years, with respect to vehicles which detect obstacles to the front of the vehicle by millimeter wave radar when linearly advancing, seat belt devices have been proposed which cause operation in cooperation with an automatic braking device and which induce a predetermined tension in the belt when it is judged that the vehicle may collide with a detected obstacle (e.g., see Japanese Unexamined Patent Application, First Publication No. 2005-41463).

However, with the aforementioned seat belt device, as operation of an automatic braking device is directly followed by an inducement of tension in the belt are conducted, there is the problem that excessive restraint may occur even if the effects on passenger posture are minor, and that comfort is reduced.

Consequently, with respect to vehicles with automatic controls such as braking, there have been demands in recent years for seat belt devices which appropriately restrain the passenger according to various control conditions.

Thus, the object of this invention is to offer a seat belt device and a control method which enable improvement of comfort while maintaining adequate restraint according to the control condition of the automatic controls of the vehicle, and which also enable natural restraining action with small discomfort.

SUMMARY OF THE INVENTION

The present invention employed the following in order to achieve the above-mentioned object.
(1) A vehicle seat-belt apparatus including: a forward monitoring device which conducts monitoring to the front of a vehicle; an avoidance assist device which supports a predetermined avoidance operation in order to avoid an obstacle when it is determined that there is an obstacle to be avoided based on a detection result of the forward monitoring device; a motor which conducts a rotary driving of a belt reel on which a belt is wound; and a control device which controls the motor, wherein the control device conducts a drive control of the motor according to a state of support of the avoidance operation by the avoidance assist device.

According to this vehicle seat-belt apparatus, when an obstacle is detected to the front of the vehicle by the forward monitoring device and when the avoidance assist device conducts avoidance assist relative to the obstacle, it is possible to conduct drive control of the motor according to the state of this avoidance assist, and to adjust the tension of the belt. Accordingly, while ensuring restraint by the way of the belt, it is possible to conduct natural restraining action with mitigation of passenger discomfort, and to improve comfort.

(2) In the aforementioned vehicle seat-belt apparatus: the avoidance assist device may include a linear braking device which imparts a predetermined braking force to the vehicle when the forward monitoring device detects the obstacle, and a turning-force support device which imparts a turning force to the vehicle; and the control device may conduct the drive control of the motor by a first control mode during an operation of the linear braking device, and conduct the drive control of the motor by a second control mode that differs from the first control mode during an operation of the turning-force support device.

In this case, in addition to conducting drive control of the motor in a first control mode during operation of the linear braking device, the control device is capable of conducting drive control of the motor in a second control mode during operation of the turning-force support device. Consequently, during the respective operations of the linear braking device and turning-force support device, it is possible to conduct drive control of the motor in the optimal control mode, prevent excessive restraint, and preserve body posture. Consequently, it is possible to improve comfort.

(3) Moreover, in the aforementioned vehicle seat-belt apparatus, the control device may increase a current volume impressed on the motor when the drive control is conducted by the second control mode above the current volume impressed in the first control mode.

In this case, by conducting drive control of the motor by increasing the current volume impressed in the second control mode above that of the first control mode, it is possible to improve the restraining capability of the belt when turning force is applied to the vehicle by the turning-force support device compared to when braking is conducted by the linear braking device. Consequently, it is possible to inhibit passenger posture changes while the vehicle is in the process of changing course. Accordingly, the passenger is able to drive with a correct posture. Consequently, it is possible to more effectively obtain the effects of support relative to obstacle avoidance operations.

(4) In addition, the aforementioned vehicle seat-belt apparatus may further include a rotation detection device which detects a rotational state of the belt reel, wherein: the control device conducts the drive control of a current volume impressed on the motor so that the belt reel is held at a predetermined first winding position based on a detection result of the rotation detection device when the drive control is conducted by the first control mode; and the control device conducts the drive control of the current volume impressed on the motor so that the belt reel is held at a second winding position whose winding amount is greater than that of the first winding position based on the detection result of the rotation detection device when the drive control is conducted by the second control mode.

In this case, based on the detection results of the rotation detection device, it is possible to hold the belt at a predetermined winding position when, for example, control is conducted by the first control mode, and to hold it at a predetermined winding position which is more toward the winding side than the first control mode when control is conducted by the second control mode. Consequently, it is possible to reduce the degree of freedom of posture change by the restraint of the belt when control is conducted by the second control mode, and to maintain passenger posture in a correct state.

(5) In addition, the aforementioned vehicle seat-belt apparatus may further include a rotation detection device which detects a rotational state of the belt reel, wherein: the control device controls a current volume impressed on the motor so that the belt reel is held at a predetermined winding position based on a detection result of the rotation detection device when the drive control is conducted by the first control mode; and the control device conducts the drive control of the motor at a predetermined impressed current volume when the drive control is conducted by the second control mode.

In this case, by holding the belt at a predetermined winding position when control is conducted by the first control mode, and by conducting drive control of the motor at a predetermined impressed current volume when control is conducted by the second control mode, it is possible to stably induce tension in the belt compared to the case where the motor is subjected to drive control by the second control mode based on the winding position. Consequently, while improving comfort by preventing unnecessary winding of the belt during control by the first control mode, it is possible to increase the restraining force of the belt during control by the second control mode beyond that during linear braking, and to maintain passenger posture in the correct state. Furthermore, it is possible to prevent the application of excessive tension by the belt. Accordingly, in addition to enabling improvement of comfort during linear braking, it is possible to achieve improved comfort while suppressing passenger posture change during vehicle turning.

(6) In addition, the aforementioned vehicle seat-belt apparatus may further include a road-surface friction coefficient estimation device which estimates a friction coefficient of a road surface during the operation of the linear braking device, wherein the control device increases or decreases a winding position of the belt reel or a current volume impressed on the motor based on the friction coefficient of the road-surface when the drive control is conducted by the second control mode.

In this case, it is possible to set the current volume impressed on the motor or the winding position of the belt reel according to the friction coefficient of the road surface. Consequently, as it is possible to maintain passenger posture without increasing the restraining force of the belt more than is necessary, it is possible to achieve further improvement in comfort.

(7) In addition, in the aforementioned vehicle seat-belt apparatus, the turning-force support device may impart the turning force to the vehicle while decelerating the vehicle by individually controlling the braking force imparted to each wheel of the vehicle.

In this case, it is possible to improve comfort by optimizing restraint by the belt in the second control mode when the turning-force support device individually controls the braking force which acts upon each wheel of the vehicle, and when turning force is applied during vehicle deceleration.

(8) In addition, in the aforementioned vehicle seat-belt apparatus, the turning-force support device may impart the turning force to the vehicle by imparting a steering reaction force to a steering device of the vehicle so that the obstacle is avoided.

In this case, it is possible to improve comfort by optimizing the restraining force of the belt in the second control mode when the turning-force support device applies turning force to the vehicle by controlling the steering reaction force of the steering device so that force is increased toward the direction of obstacle avoidance.

(9) In addition, with the aforementioned vehicle seat-belt apparatus, the turning-force support device may impart the turning force to the vehicle while decelerating the vehicle by individually controlling the braking force which is imparted to each wheel of the vehicle; and the turning-force support device may impart the turning force to the vehicle by imparting a steering reaction force to a steering device of the vehicle so that the steering reaction force is increased toward a direction in which a passenger conducts a steering operation, based on a detection result of a steering angle detection device which detects a steering angle operated by the passenger.

In this case, it is possible to improve comfort by optimizing the restraining force of the belt in the second control mode when the turning-force support device, in order to turn the vehicle in a direction which avoids the obstacle, individually controls the braking force of each wheel of the vehicle, and conducts control so that the force of the steering reaction force of the steering device is increased in the direction which avoids the obstacle.

(10) In addition, the aforementioned vehicle seat-belt apparatus may further include a steering control device which controls at least one of the steering angle or the steering reaction force of the steering device, wherein the control device varies a winding position of the belt reel or a current volume impressed on the motor, based on a control volume of the steering control device.

In this case, the control device is able to vary the current volume impressed on the motor and the winding position of the belt by the belt reel based on control volumes such as target values of the steering reaction force controlled by the steering control device and the steering angle set during avoidance assist. By this way, it is possible to apply the appropriate restraining force to the belt according to vehicle behavior and according to changes in passenger posture, thereby enabling further improvement in comfort.

Moreover, the present invention also employed the followings in order to achieve the above-mentioned object.

(11) A control method for vehicle seat belt device including the steps of: imparting a braking force to a vehicle; controlling a motor when the braking force is imparted, and holding a belt wound on a belt reel at a predetermined winding position; supporting a turning force of the vehicle after the braking force is imparted; and conducting a drive control of the motor at a predetermined impressed current volume when the turning force is supported.

According to this method, the winding position of the belt reel is held at a predetermined winding position when braking force is applied relative to the direction of advancement of the vehicle, and the belt reel is wound at a predetermined impressed current volume during turning of the vehicle. As a result, excessive belt tension does not occur, and it is possible to raise tension only during turning, thereby enabling improvement of comfort.

Moreover, the present invention also employed the followings in order to achieve the above-mentioned object.

(12) A control method for vehicle seat-belt apparatus including the steps of: imparting a braking force to a vehicle; holding a winding position of a belt reel at a predetermined first winding position when the braking force is imparted; supporting a turning force of the vehicle after the braking force has been imparted; and holding the belt reel at a second winding position that differs from the first winding position when the turning force is supported.

According to this method, the winding position of the belt reel is held at a predetermined winding position when braking force is applied relative to the direction of advancement of the vehicle, and the winding position of the belt reel during vehicle turning is held at a winding position which differs from a predetermined winding position. As a result, it is possible to hold respectively appropriate belt-reel winding positions when, for example, braking force is applied relative to the direction of advancement of the vehicle, and when the vehicle is turned. Accordingly, it is possible to improve comfort by preventing the occurrence of discomfort to the passenger due to excessive restraint by the belt or the like.

DETAILED DESCRIPTION OF THE INVENTION

Next, an embodiment of this invention is described with reference to drawings.

Figure 1:
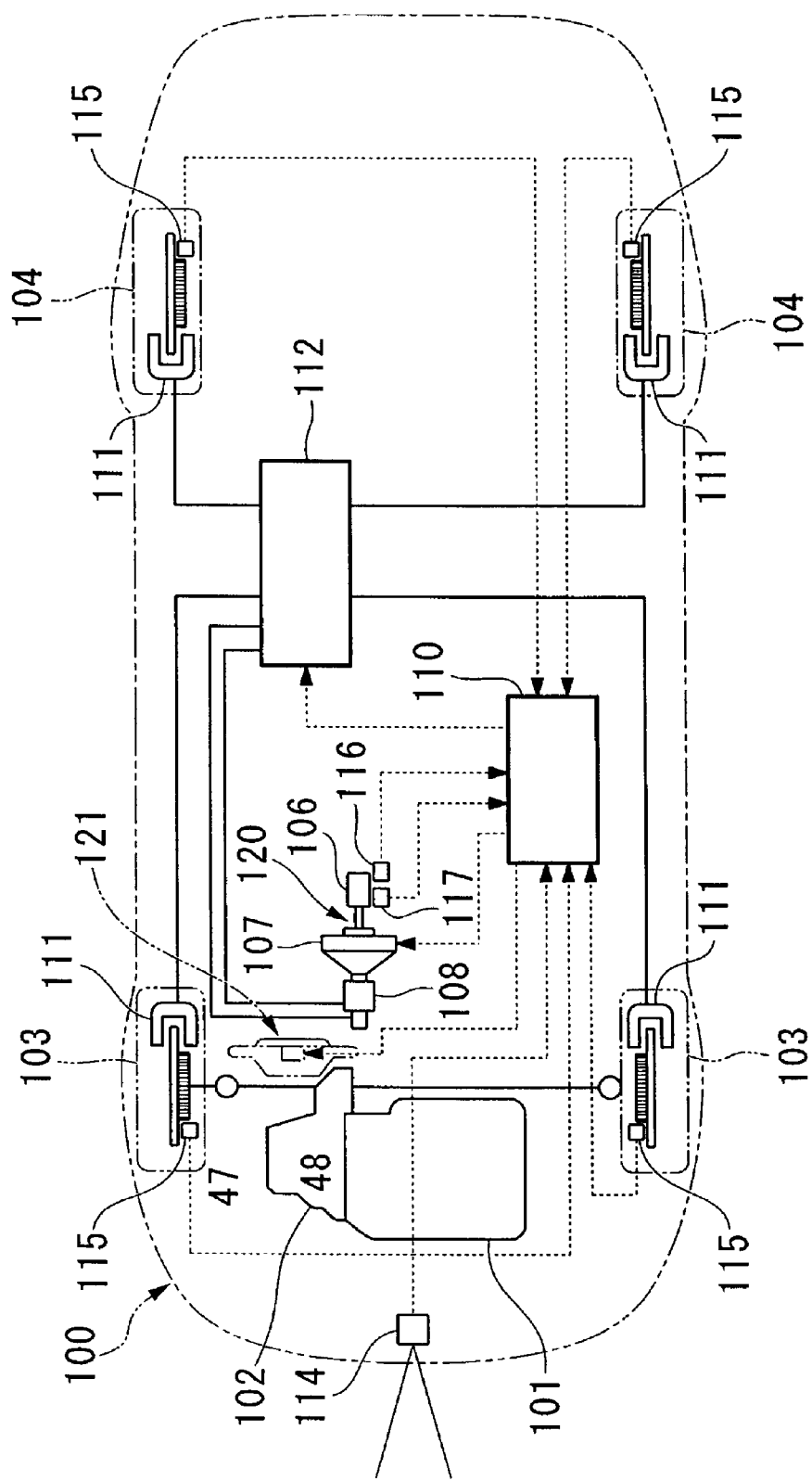
FIG. 1 is a schematic block diagram of the vehicle according to an embodiment of the present invention.

FIG. 1 shows a vehicle 100 to which an embodiment of this invention is applied. This vehicle 100 has left and right front wheels 103 which are driving wheels to which the driving force of an engine 101 is transmitted via a transmission 102, and left and right rear wheels 104 which are driven wheels.

The vehicle 100 also has a brake pedal 106 which is manipulated by a passenger, an electronic control pressure booster 107 which is connected to the brake pedal 106, and a master cylinder 108 which is connected to the electronic control pressure booster 107. Here, the electronic control pressure booster 107 mechanically boosts the tread force of the passenger which is inputted to the brake pedal 106, and causes operation of the master cylinder 108. The master cylinder 108 is also operated by signals from the control device 110 without manipulation of the brake pedal 106. Moreover, the master cylinder 108 produces hydraulic pressure according to the output from the electronic control pressure booster 107.

Furthermore, the vehicle 100 has brake calipers 111 which decelerate the vehicle 100 by applying braking force to the front wheels 103 and rear wheels 104 by the hydraulic pressure introduced from the master cylinder 108, and pressure adjustors 112 which are provided between the brake calipers 111 and the master cylinder 108, and which individually adjust the hydraulic pressure outputted from the master cylinder 108 and used by each brake caliper 111 based on the control of the control device 110.

In addition, the vehicle 100 has a radar 114 which is provided at the front end and which detects objects including vehicles to the front of the direction of advancement of the vehicle by receiving reflected waves from objects to the front that emit, for example, millimeter waves, vehicle wheel speed sensors 115 which are provided at positions corresponding to the front wheels 103 and rear wheels 104 and which detect the speed or the like of the vehicle from rotational pulses of the front wheels 103 and rear wheels 104, a brake switch 116 which detects whether or not there is manipulation of the brake pedal 106 by the passenger, and a stroke sensor 117 which detects manipulation strokes of the brake pedal 106 by the passenger. These devices are connected to the control device 110.

Furthermore, a steering device 10 is connected to the left and right front wheels 103 which are the driving wheels of the vehicle 100.

Figure 2:
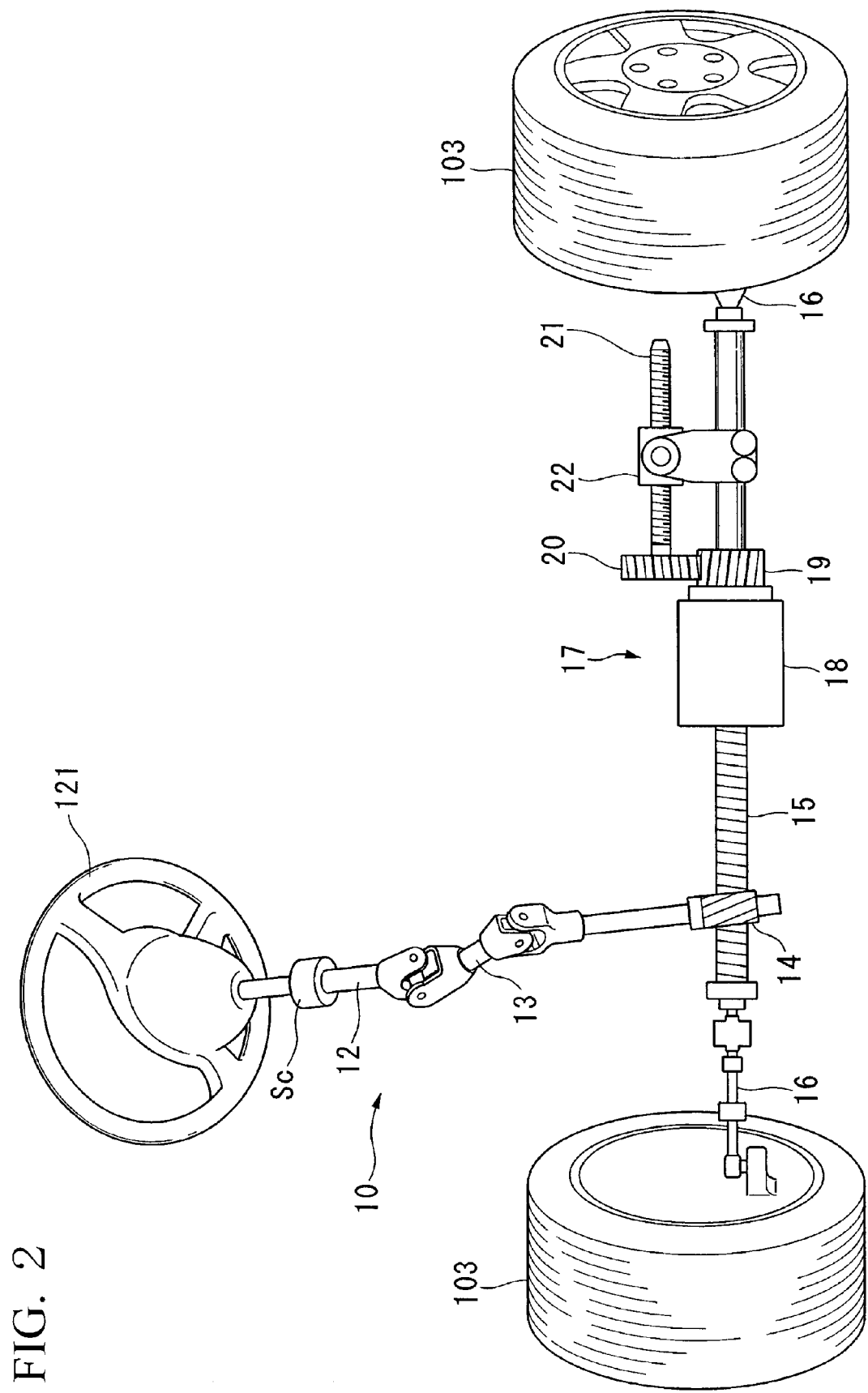
FIG. 2 is a schematic block diagram of the steering device of this same embodiment.

As shown in FIG. 2, a steering wheel 121 of this steering device 10 communicates to a rack 15 via a steering shaft 12, connection shaft 13 and pinion 14, and the reciprocation of the rack 15 is further communicated to the left and right front wheels 103 via left and right tie-rods 16. A power steering device 17 provided in the steering device 10 is provided with a drive gear 19 provided at the output shaft of a steering actuator 18, a driven gear 20 which engages with this drive gear 19, a screw shaft 21 integrated with this driven gear 20, and a nut 22 which engages with this screw shaft 21 and which is coupled with the aforementioned rack 15. Consequently, if the steering actuator 18 is driven, its driving force can be transmitted to the left and right front wheels 103 via the drive gear 19, driven gear 20, screw shaft 21, nut 22, rack 15, and left and right tie-rods 16.

Figure 3:
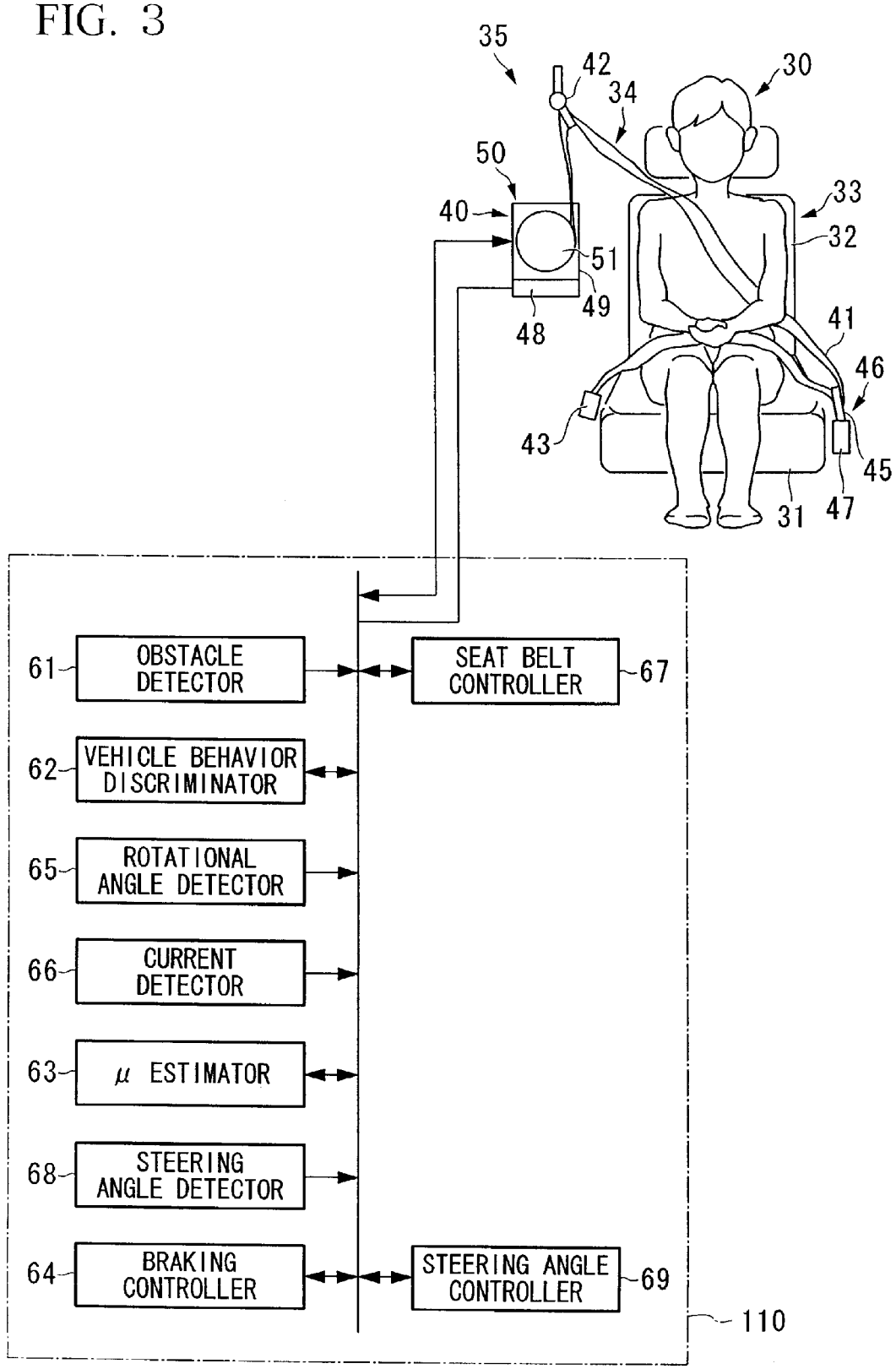
FIG. 3 is a schematic block diagram of the control device and seat-belt device of the same embodiment.

As shown in FIG. 3, a seat 33 is installed in the vehicle 100 which is provided with a seat cushion 31 that primarily supports the haunches of a passenger 30 and a seat back 32 that primarily supports the back of the passenger 30. Relative to this seat 33, a seat belt device 35 is provided which restrains the passenger by a seat belt 34. The seat belt device 35 is a so-called 3-point system, and is installed in the seat 33 of the driver. While the seat belt device 35 is installed in the driver's seat, it is also installed in the seats of passengers other than the driver.

With respect to the seat belt device 35, webbing 41 of the seat belt 34 extends upward from a retractor 40 provided in a center pillar or the like (not illustrated in the drawing) on the outer side of the vehicle compartment relative to the seat 33, and is inserted through a through-anchor 42 supported at the upper end of the center pillar. The tip of this webbing 41 is attached to the car-body floor side via an outer anchor 43 on the outer side of the vehicle compartment relative to the seat 33. The seat belt 34 has a tongue plate 45 which is inserted through a part which is positioned between the through-anchor 42 and outer anchor 43 of the webbing 41, and this tongue plate 45 can be freely attached to and detached from a buckle 46 attached to the car-body floor side of the car-body interior relative to the seat 33.

When the passenger 30 in a seated state in the seat 33 pulls the seat belt 34 out of the retractor 40 by pulling the tongue plate 45, and attaches the tongue plate 45 to the buckle 46, the portion of the seat belt 34 from the through-anchor 42 to the tongue plate 45 primarily restrains the chest of the passenger from his/her shoulder on the opposite side relative to the seat 33, and the portion from the tongue plate 45 to the outer anchor 43 primarily restrains the abdominal area of the passenger 30 on the opposite side relative to the seat 33.

The retractor 40 is provided with an irreversible first pretensioner 48 which instantly retracts and fastens the seat belt 34 with the explosive force of an explosive. The first pretensioner 48 may be of the explosive type, spring type, or the like.

The retractor 40 is also provided with a reversible second pretensioner 50 which retracts and fastens the seat belt 34 with the driving force of a motor 49. The second pretensioner 50 winds and retracts the seat belt 34 in the fastening direction by the normal rotation of the motor 49 which causes the forcible normal rotation of the reel 51 that winds the webbing 41 inside the retractor 40. On the other hand, the seat belt 34 is played out in the fastening release direction by the reverse rotation of the motor 49 which causes the forcible reverse rotation of the reel 51.

When the motor 49 is continuously energized by a predetermined current volume per unit time, the aforementioned reel 51 is rotated at fixed torque according to this impressed current volume. If this torque exceeds the load due to the weight of the passenger or the like, winding occurs, and if it falls below it, unwinding occurs. After the aforementioned winding and unwinding, it is possible to hold the reel 51 at a position where it has rotated at a desired rotational angle by maintaining the torque of the aforementioned motor 49 and the aforementioned load in a balanced state. That is, when energization is continuously conducted at a predetermined current volume, the webbing 41 can maintain a tension corresponding to the predetermined torque, and the webbing 41 can be wound by the reel 51 by a desired amount by increasing or decreasing the impressed current volume according to the state of the aforementioned load.

The aforementioned control device 110 is provided with an obstacle detector 61, a vehicle behavior discriminator 62, a road-surface friction coefficient ($\mu$) estimator 63, a braking controller 64, a rotational angle detector 65, a current detector 66, a seat belt controller 67, a steering angle detector 68, and a steering controller 69.

The obstacle detector 61 calculates the detection results of the radar 114. Specifically, it calculates a relative relation including the distance between the vehicle and an object in front of the direction of advancement of the vehicle from the time of millimeter wave emission and receipt. Based on this calculated relative relation, it is discriminated whether or not there is a possibility of contact between the vehicle and the object in front of the direction of advancement, that is, whether or not there is an obstacle to be avoided.

The vehicle behavior discriminator 62 discriminates the behavior of the vehicle 100 based on the detection results of various sensors such as the aforementioned vehicle wheel speed sensors 115, yaw rate sensors (not illustrated in the drawings), and lateral acceleration sensors (not illustrated).

The road-surface friction coefficient estimator 63 estimates the friction coefficient of the road surface on which the vehicle 100 is traveling. For example, the braking force of the rear wheels 104 which are not driving wheels is increased by the braking controller 64 (hereinafter referred to as "$\mu$-estimation braking"), and the difference in vehicle wheel speed with the front wheels 103 which are the driving wheels is calculated based on the output of the vehicle wheel speed sensors 115. The skid amount of the rear wheels 104 is determined, and the friction coefficient between the road surface and the tires (not illustrated) of the rear wheels 104 is calculated using the axle load of the front wheels 103, the inverse of the skid amount of the rear wheels 104, and the brake pressure value of the rear wheels 104.

The braking controller 64 controls the braking force of the rear wheels 104 during calculation of the estimated friction coefficient value by the aforementioned road-surface friction coefficient estimator 63. In addition, it is discriminated whether there is a possibility of contact between the vehicle 100 and an object in front of the direction of advancement, based on the calculation results of the road-surface friction coefficient estimator 63, the detection results of the brake switch 116 and stroke sensor 117, the detection results of the obstacle detector 61, and the discrimination results of the vehicle behavior discriminator 62. When there is a possibility of contact, the braking controller 64 outputs control commands to the electronic control pressure booster 107 and pressure adjustor 112 as so-called collision mitigation braking. By this way, control is conducted which applies braking force to the vehicle in the direction of advancement, and control is conducted which supports steering operations by individually controlling the braking force of each wheel of the vehicle and by generating a predetermined yaw moment relative to the vehicle.

The rotational angle detector 65 receives pulse signals from a rotational angle sensor (not illustrated) such as a linear encoder which is provided in the seat belt device 35, whereby it detects the winding position of the webbing 41 wound in the reel 51 of the seat belt device 35.

The current detector 66 detects the electric current value which energizes the motor 49 that rotationally drives the reel 51 of the seat belt device 35. Here, the rotational torque of the motor 49 may be estimated from the amount of supplied current, that is, the impressed current volume per unit time.

The seat belt controller 67 conducts drive control of the aforementioned seat belt device 35. It conducts drive control of the first pretensioner 48 by receiving detection signals from sensors (not illustrated) which detect a collision of the vehicle 100, and it also conducts drive control of the motor 49 of the second pretensioner 50 based on the respective detection results and discrimination results of the aforementioned obstacle detector 61, vehicle behavior discriminator 62, rotational angle detector 65, current detector 66, and steering angle detector 68.

The steering angle detector 68 detects the existing steering angle of the right and left front wheels 103 which are the steering wheels.

When it is determined that there is a possibility of contact between the vehicle 100 and an obstacle in front of the direction of advancement based on the detection results and discrimination results of the aforementioned steering angle detector 68, obstacle detector 61, and vehicle behavior discriminator 62, and when the driver manipulates a steering wheel 121 to conduct avoidance operations relative to the obstacle, the steering controller 69 drives the steering actuator 18 of the aforementioned steering device 10, and conducts control of steering reaction force in order to support both the avoidance operations of the driver relative to the obstacle and the subsequent return operations. In addition, based on the detection results of the obstacle detector 61, it sets a target steering angle for purposes of avoiding the obstacle, and conducts limiting control so that operation of the steering wheel 121 beyond the target steering angle is not conducted (steering angle control).

Figure 9:
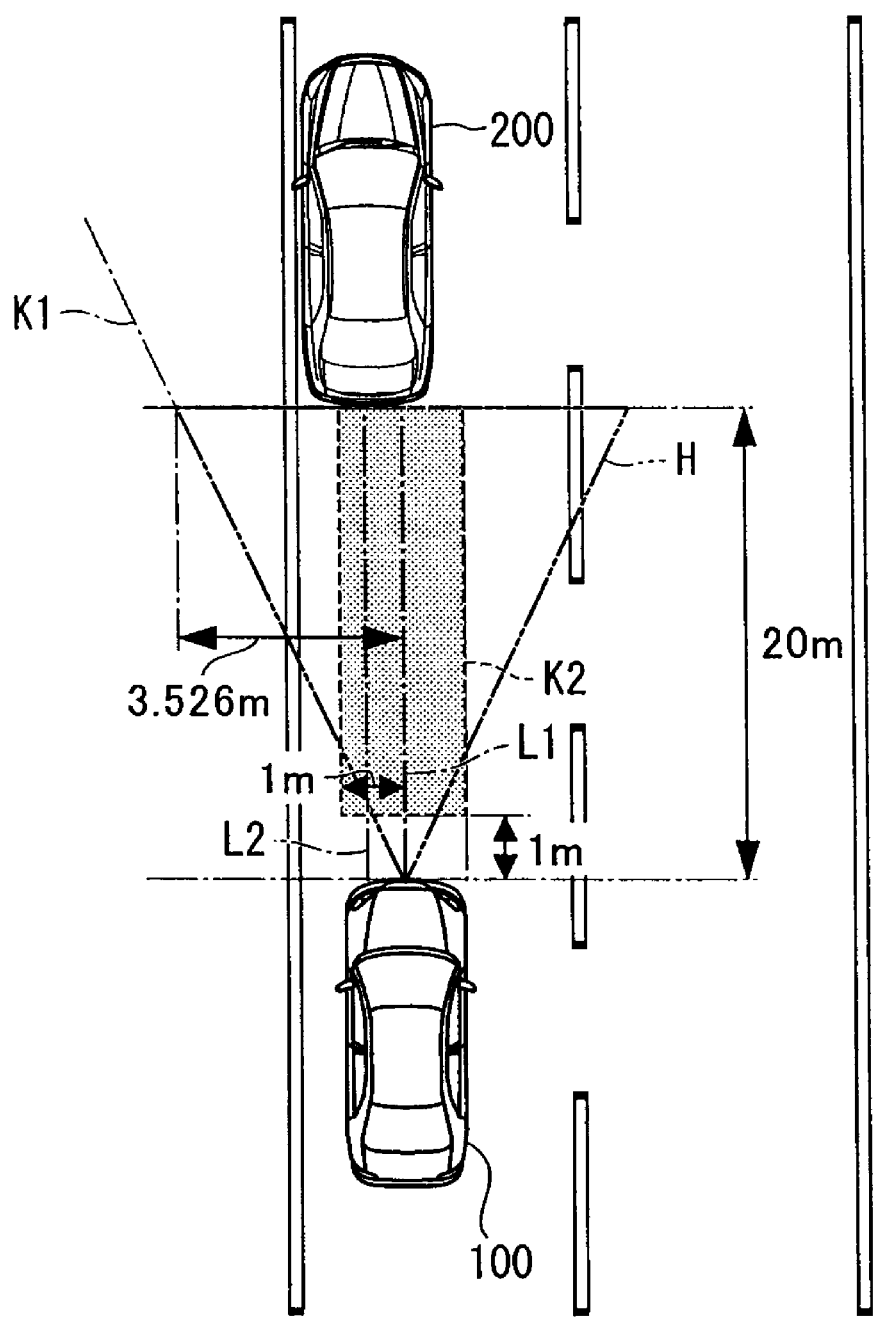
FIG. 9 is an explanatory view of the case where a detected obstacle is determined to be an obstacle to be avoided by the obstacle detector of this same embodiment.
Figure 10:
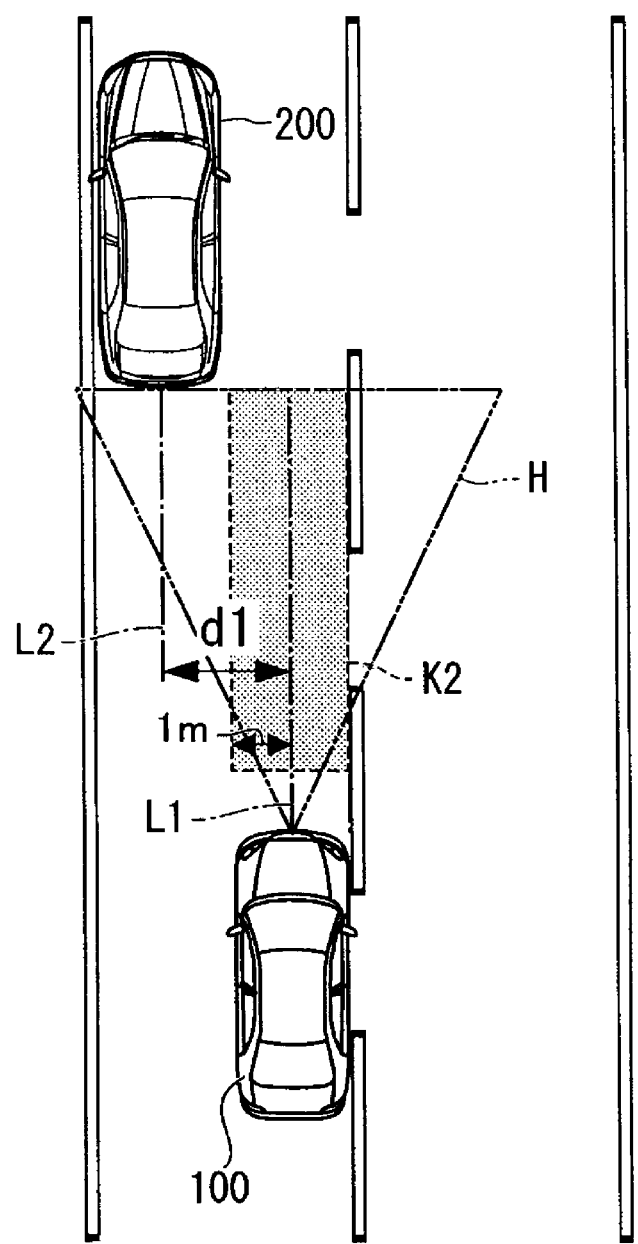
FIG. 10 is an explanatory view of the case where a detected obstacle is not determined to be an obstacle to be avoided by the obstacle detector of this same embodiment.

Next, the detection of the obstacle by the obstacle detector 61 is described with reference to FIG. 9 and FIG. 10. FIG. 9 and FIG. 10 constitute an example where, to the front of the vehicle 100 which is an automobile, a vehicle 200 exists which is traveling in the same direction of advancement as the vehicle 100.

The radar 114 connected to the obstacle detector 61 is arranged at a central position in the widthwise direction at the front end of the vehicle 100, and forms a detection range K1 which gradually enlarges in width from the front end of the vehicle 100 toward the front in the direction of advancement until a position located at a predetermined distance (e.g., 100 m).

In the case of approach of the vehicle 200 which is traveling ahead within a discrimination region H which is within a predetermined distance (e.g., 20 m) from the front end of the vehicle 100 in which an obstacle to be avoided (hereinafter referred to simply as "obstacle of avoidance") is discriminated in the detection range K1 of the radar 114, the obstacle detector 61 discriminates whether or not this vehicle 200 is an obstacle of avoidance.

Here, the obstacle detector 61 detects the vehicle width of the vehicle 200 which is traveling ahead, based on the detection results of the radar 114. Furthermore, this vehicle 200 is detected as an obstacle of avoidance in the case where the vehicle 200 which is traveling ahead enters into region K2 as defined bellow. The possibility is high that the vehicle 100 would collide with an obstacle existing in region K2, if the vehicle 100 travels straight ahead as is. Region K2 has a width on the same order as the width of the vehicle 100. For example, as shown in FIG. 9, region K2 may be a band-like region (hereinafter referred to simply as a "region of avoidance") which has a specified width to the right and left (e.g., 1 m) along a line L1 (hereinafter simply "center-of-gravity line") extending from the center (hereinafter simply "center of gravity") of the widthwise direction of the vehicle 100 toward the front direction, starting from a position separated by a predetermined distance (e.g., 1 m) toward the front from the front end of the vehicle 100.

In the case where a predetermined offset distance d1 (see FIG. 10) precluding a risk of collision is not ensured between the center-of-gravity line L1 of the vehicle 100 and a center-of-gravity line L2 which extends alongside center-of-gravity line L1 from the center of gravity of the vehicle 200 which is traveling ahead alongside the direction of advancement of the vehicle 100, the vehicle 200 which is traveling ahead is detected as an obstacle of avoidance. Here, the predetermined offset distance d1 is obtained by adding a predetermined distance (e.g., 10 cm) as clearance to the average value of the width of the vehicle 100 and the width of the vehicle 200 detected by the radar 114. If the predetermined distance is added to the target distance between the center-of-gravity line L1 of the vehicle 100 and the center-of-gravity line L2 of the vehicle 200 which is traveling ahead, clearance between the vehicle 100 and the vehicle 200 which is ahead would be secured to the extent of the aforementioned predetermined distance even if the vehicle 100 advances straight ahead as is and overtakes the vehicle which is ahead.

As shown in FIG. 10, in the case where the vehicle 200 which is traveling ahead enters discrimination region H outside the region of avoidance K2 to the extent that the aforementioned predetermined offset distance with which there is no risk of collision is secured, the obstacle detector 61 (see FIG. 3) discriminates that the pertinent vehicle 200 is not an obstacle of avoidance. As another examples of the discrimination range H shown in FIG. 9 and FIG. 10, it is possible use a region H having an angle widening toward the front in the direction of advancement of the vehicle at 10 degrees, and having a width of 3.526 m, at 20 m to the front of the vehicle. A description was given of the case where a vehicle 200 which is traveling ahead constitutes the object of avoidance, but it is not limited to a vehicle 200 which is traveling ahead in the same direction, and an object of avoidance may also be constituted by a vehicle traveling in a different direction, stationary objects, and the like.

Next, the obstacle avoidance assist processing of the aforementioned control device 110 is concretely described with reference to FIGS. 4 to 8.

Figure 4:
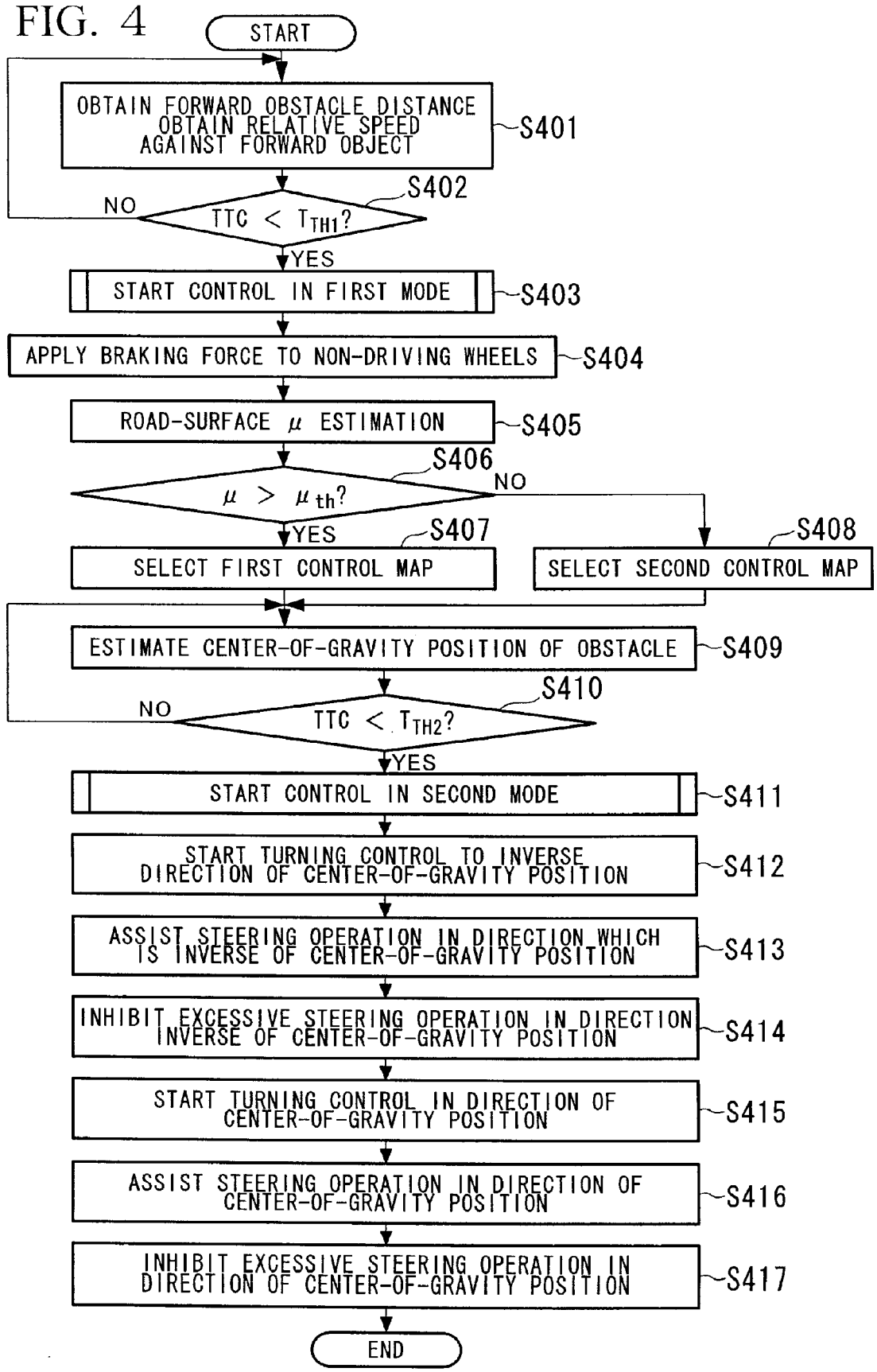
FIG. 4 is a flow chart of the obstacle avoidance assist processing of this same embodiment.

First, in step S401 of the flow chart shown in FIG. 4, the distance until the obstacle to be avoided ahead of the vehicle 100 is obtained by the obstacle detector 61, as is the relative speed with respect to the obstacle to be avoided.

In step S402, the time to collision (TTC) until the vehicle 100 collides with the obstacle ahead is estimated based on the distance to the obstacle and the relative speed obtained in step S401, and it is discriminated whether or not this time to collision TTC is smaller than the collision time $T_{th1}$ in which there is risk that it would be difficult to avoid collision if braking control of the vehicle 100 is not conducted. If the discrimination result of step S402 is "yes" (TTC<$T_{th1}$), the process proceeds to step S403; if "no" (TTC≧$T_{th1}$), the process returns to step S401, and the above-described processing is repeated.

In step S403, control of the seat belt device 35 in a below-described first mode is started, and the process advances to step S404.

In step S404, braking control (hereinafter simply "µ-estimation braking") relative to the rear wheels 104 which are the non-driving wheels is conducted on the condition that the vehicle 100 is advancing straight ahead in order to estimate the friction coefficient (µ) of the road surface by the road-surface friction coefficient estimator 63.

In step S405, the difference between the wheel speed of the rear wheels 104 and the wheel speed of the front wheels 103 which are the driving wheels when µ-estimation braking which is linear braking is conducted by the braking controller 64 is obtained by the road-surface friction coefficient estimator 63, the skid amount of the rear wheels 104 is determined, and an estimated value of the friction coefficient between the tires and the roadway (hereinafter simply "road-surface µ") is calculated using the axle load of the front wheels 103, the inverse of the skid amount of the rear wheels 104, and the braking pressure value of the rear wheels 104.

During µ-estimation braking, the deceleration is on the order of 0.1 G. Here, G indicates the gravitational acceleration of 9.8 m/s².

In step S406, it is discriminated whether or not road-surface µ is larger than a predetermined road-surface $µ_{th}$ for switching of the braking control map. If the discrimination result of step S406 is "yes" (µ>$µ_{th}$), the process proceeds to step S407; if "no" (µ≧$µ_{th}$), the process proceeds to step S408.

Figure 11:
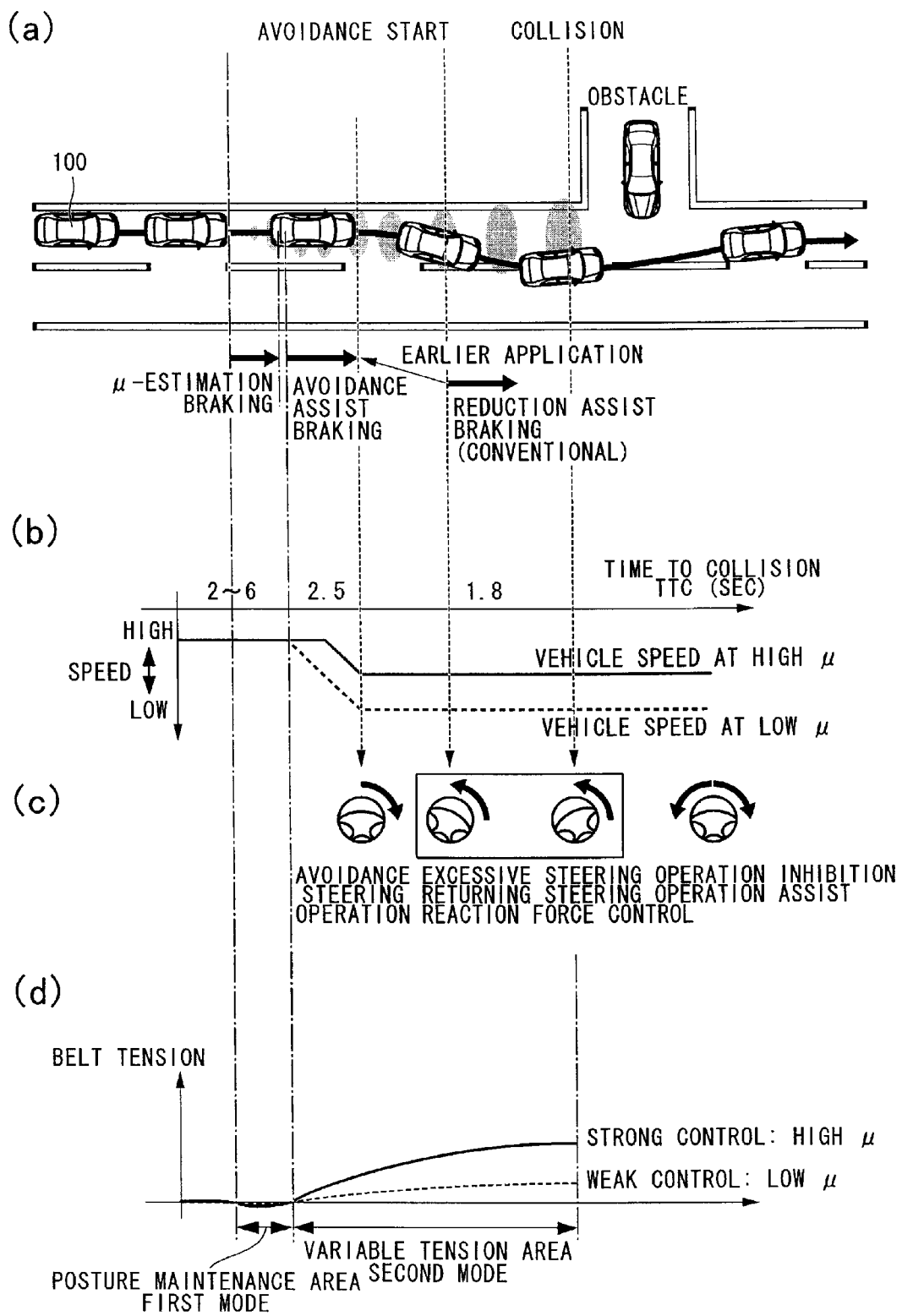
FIG. 11 is a timing chart of the avoidance assist control of this same embodiment.

In step S407, a first control map which is a map of vehicle speed relative to road-surface µ is selected, and the process advances to S409. Here, the first control map, shown by the solid line in FIG. 11, part (b), is the map which is selected when road-surface µ is larger than the predetermined threshold value $µ_{th}$ (high µ occasions). The first control map is set so that avoidance assist braking which is braking control is started after several hundred ms have elapsed from the point when calculation of road-surface µ finished. Moreover, the first control map is set so that when deceleration occurs at a predetermined value (e.g., equivalent to 0.2 G) as the avoidance assist braking, and when vehicle speed reaches a predetermined first speed, this first speed is maintained. Here, the predetermined first speed signifies a speed at which obstacle avoidance can be conducted without occurrence of skidding even when steering operation is conducted to avoid the obstacle in the cases of high µ. The predetermined second speed is defined similarly for the low µ cases. The processing of step S407 is conducted at faster timing than (in advance of) the timing of the braking control which has conventionally been conducted as collision mitigation braking, as shown in FIG. 11, part (a).

In step S408, a second control map of vehicle speed relative to road-surface µ is selected, and the process advances to S409. Here, the second control map, shown by the broken line in FIG. 11, part (b), is the map which is selected when road-surface µ is smaller than the predetermined threshold value $µ_{th}$ (low µ occasions), and is set so that avoidance assist braking which is braking control is started immediately after termination of road-surface µ calculation.

With the second control map, braking control is conducted as the avoidance assist braking at a predetermined deceleration (e.g., equivalent to 0.3 G) which is larger than that of the braking control of the aforementioned first control map. When vehicle speed reaches the predetermined second speed which is lower than the first speed of the first control map, this second speed is maintained.

Here, when road-surface μ is low which renders skidding likely, it is necessary in order to prevent skidding to effect a reduction to the second speed from the first speed for the case where road-surface μ is high. However, when linear braking control is started with the same control as the first map, it takes more time to reach the second speed than to reach the first speed. Consequently, in order to effect a rapid reduction to the second speed with the second control map, the deceleration is started faster than with the first control map, i.e., immediately after the road-surface μ estimation of step S405, and the vehicle speed is reduced at a somewhat higher deceleration than the first control map.

Next, in step S409, the center-of-gravity position of the obstacle is estimated by the obstacle detector 61 based on the detection results of the radar 114, and the process proceeds to step S410.

In step S410, it is discriminated whether or not the time to collision TTC until the automobile collides with the obstacle to the front is smaller than the predetermined collision time $T_{th2}$. If the discrimination result of step S410 is "yes" ($TTC<T_{th2}$), the process proceeds to step S411; if "no" ($TTC \geq T_{th2}$), the process returns to the aforementioned step S409, and the above-described processing is repeated. Here, $T_{th2}$ is defined as a time in which there is risk that it would be difficult to avoid collision if steering control by the steering wheel 121 is not conducted at the time.

In step S411, control of the seat belt device 35 in a below-described second control mode is started, and the process advances to step S412.

In step S412, it is discriminated by the obstacle detector 61 whether the center-of-gravity line extending from the center-of-gravity position of the detected obstacle is to the left or right of the direction of advancement based on the center-of-gravity position of the automobile, the braking controller 64 sets a target yaw moment based on this discrimination result and based on road-surface μ, and the hydraulic pressure to be applied to each caliper of the front wheels 103 and rear wheels 104 is individually controlled. For example, the braking force of the vehicle wheels on the opposite side of the obstacle based on the center-of-gravity line of the vehicle 100 is increased above the braking force of the vehicle wheels on the obstacle side, and turning-force support control is started which applies turning force to the vehicle 100 on the side opposite the obstacle side so as to obtain the target yaw moment. Instead of the aforementioned target yaw moment, it is also possible to set a predetermined target steering angle which is an upper-limit value of the steering angle.

In step S413, when avoidance operations are conducted with the steering wheel 121 of the driver, the steering avoidance operation of FIG. 11, part (c), and when it is detected by the steering angle detector 68 that steering operation has been conducted, the steering controller 69 conducts control which increases steering reaction force so as to impede steering operation in the direction which is the reverse of the direction for avoiding this obstacle, thereby supporting steering operation in the direction that avoids the obstacle.

Here, the steering operation during obstacle avoidance by the driver is ordinarily an operation in the direction which is opposite to the direction in which the obstacle exists, i.e., in the direction which avoids the obstacle. Consequently, the aforementioned steering reaction force is controlled so that force is increased toward the direction in which steering operation is conducted. It should be noted that description was given for the case where support of steering operation is conducted after detection of steering operation by the driver, but it is also possible to conduct setting so that, for example, the increase in steering reaction force is automatically started according to the aforementioned time TTC even in the case where steering operation is not detected. The above-described steering force support control may also be started by the braking controller 69 after steering operation has been detected by the steering angle detector 68.

In step S414, in order to prevent the excessive turning of the steering wheel 121 by the above-described processing of step S413, steering reaction force is increased so as to inhibit steering operation in the direction which avoids the obstacle when it is determined in the steering controller 69 that the steering angle detected by the steering angle detector 68 has exceeded the predetermined target steering angle, or when it is determined by the vehicle behavior discriminator 62 that the yaw moment of the vehicle 100 has exceeded the target yaw moment, i.e., the excessive-turning-inhibition reaction-force control of FIG. 11, part (c).

Here, with respect to the aforementioned increase of steering reaction force in step S414, it is sufficient if reaction force is applied such that the steering wheel 121 is not turned in the obstacle avoidance direction more than the target steering angle. The aforementioned target steering angle and target yaw moment are set based on the obstacle offset distance d1 for purposes of discriminating excessive turning of the steering wheel 121 in the direction of obstacle avoidance.

In step S415, when it is discriminated based on the detection results of the obstacle detector 61 that the possibility of collision between the automobile and the obstacle has been eliminated, the hydraulic pressure applied to each caliper 111 of the front wheels 103 and rear wheels 104 is individually controlled, e.g., the braking pressure of the vehicle wheels on the obstacle center-of-gravity line side is increased more than the braking force of the vehicle wheels on the side opposite the center-of-gravity position of the obstacle, and turning-force support control is started for the purpose of applying turning force to the vehicle in the direction which is the reverse of the above-described step S412.

In step S416, in order to support steering operation for the purpose of returning to the original travel path after obstacle avoidance, when steering operation in the direction of the obstacle center-of-gravity position is detected by the steering angle detector 68, the steering controller 69 conducts control which increases steering reaction force so that steering operation is impeded in the direction which is opposite to the direction of the obstacle center-of-gravity position, i.e., the turn back support reaction force control of FIG. 11, part (c). In short, steering reaction force control is conducted so that force is increased in the direction in which steering operation has been conducted, and steering operation is supported in the direction of return from obstacle avoidance. It is also possible to automatically start the support of steering operation in the direction of return based on elapsed time or travel distance even if detection of steering operation has not occurred.

In step S417, in order to prevent excessive turning of the steering wheel 121 by the processing of step S416, the steering controller 69 conducts control which increases the steering reaction force of the steering wheel 121 so as to inhibit steering operation in the direction which is opposite to that of step S413, i.e., toward the side where the obstacle exists, when it is detected that the predetermined steering angle has been exceeded based on the detection results of the steering angle detector 68, or when it is determined by the vehicle behavior discriminator 62 that the yaw moment of the vehicle 100 has exceeded the predetermined yaw moment. This brings the above-described obstacle avoidance assist processing to a close. The predetermined steering angle in step S417 is a steering angle which laterally inverts the target steering angle, which was set in the above-described step S414, based on the origin of the steering angle; the predetermined yaw moment is a yaw moment which laterally inverts the orientation of the target yaw moment of step S414.

Figure 5:
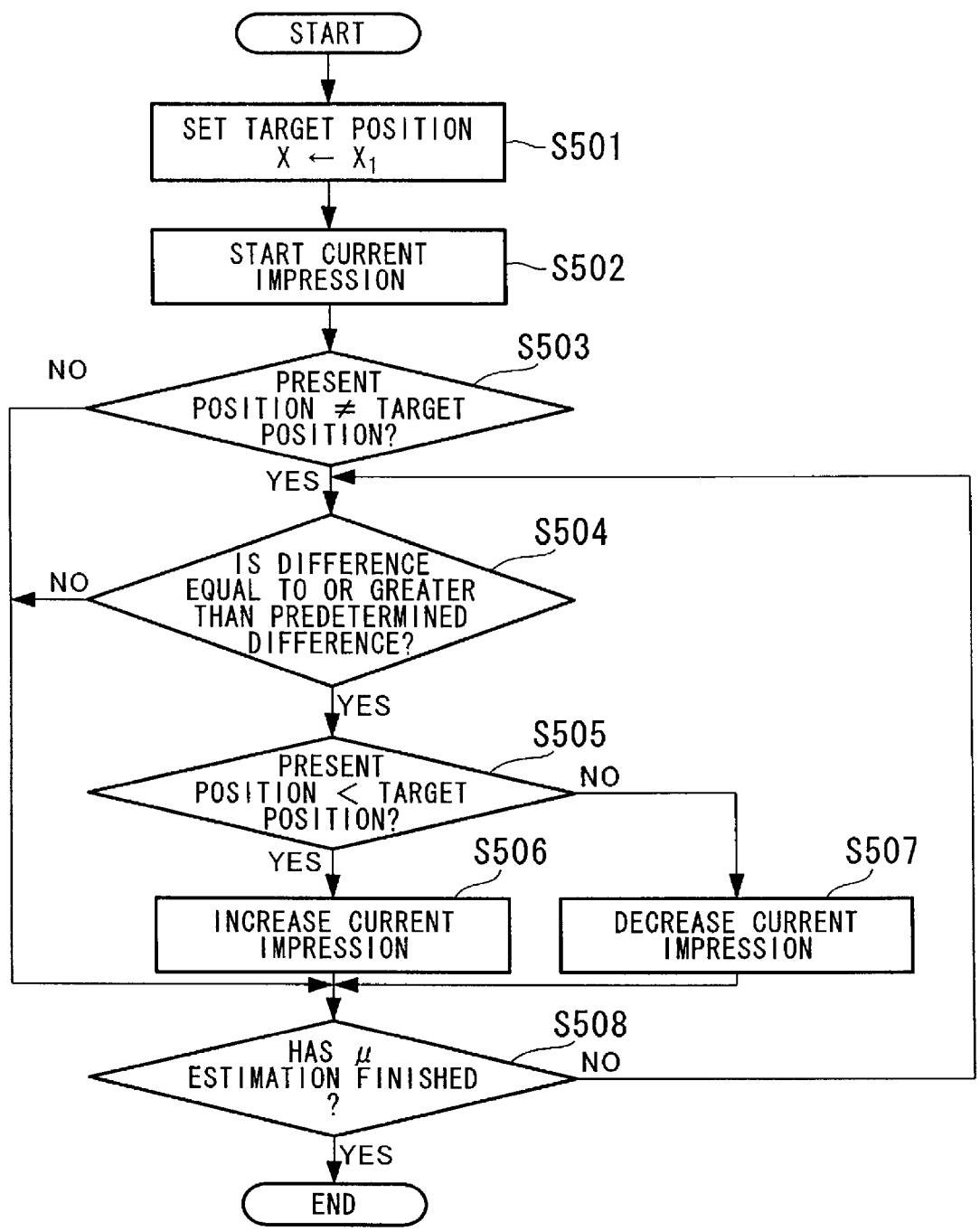
FIG. 5 is a flow chart of the first mode of FIG. 4.

Next, referring to the flow chart of FIG. 5, a description is given of control processing in the first mode of the seat belt device 35 during the μ-estimation braking shown in the above-described FIG. 11, part (a). This processing is processing which is executed in parallel with the main flow of FIG. 4.

First, in step S501, a target position $X_1$ for winding by the reel 51 is obtained by referring to a map (not illustrated in the drawings) of winding amounts of the webbing 41 relative to road-surface μ based on the road-surface μ calculated by a μ estimator 63, and this target position $X_1$ is set to a winding position X. Here, the winding action by the reel 51 starts from the winding position at the point when the aforementioned processing was conducted, and the aforementioned winding amount does not signify a winding amount that starts from an absolute winding position (e.g., the origin). At normal times, as the webbing 41 of the seat belt device 35 is energized in the winding direction, the winding start position of the webbing 41 varies according to the body type, seating position and sitting posture of the passenger.

In step S502, application of current to the motor 49 begins at an impressed current volume where the torque of the motor 49 exceeds the load due to the weight of the passenger or the like until the aforementioned target position $X_1$ is reached.

In step S503, it is discriminated whether or not the existing position of the reel and the target position are different based on the output of the rotational angle detector 65. If the discrimination result of step S503 is "yes" (existing position≠target position), the process proceeds to step S504; if "no" (existing position=target position), the process proceeds to step S508.

In step S504, it is discriminated whether or not the difference between the existing position and the target position is at or above a predetermined difference. If the discrimination result of step S504 is "yes" (at or above predetermined difference), the process proceeds to step S505; if "no" (less than predetermined difference), the process proceeds to step S508. Here, the aforementioned predetermined difference indicates the tolerance range around the target position.

In step S505, it is discriminated whether or not the existing position is smaller than the target position. If the discrimination result of step S505 is "yes" (existing position<target position), the process proceeds to step S506; if "no" (existing position>target position), the process proceeds to step S507.

In step S506, after the current volume impressed on the motor 49 (the impressed current volume per unit time) is increased by a preset predetermined increment, the process proceeds to step S508. Here, with respect to the aforementioned predetermined increment, for example, a value on the order of several percent of the impressed current volume used in step S502 is used.

In step S507, after the current volume impressed on the motor 49 (the impressed current volume per unit time) is reduced by a preset predetermined decrement, the process proceeds to step S508. Here, with respect to the aforementioned predetermined decrement, as with the aforementioned predetermined increment, for example, a value on the order of several percent of the impressed current volume used in step S502 is used.

In step S508, it is discriminated whether or not the processing of step S405 which calculates road-surface μ has terminated. If the discrimination result of step S508 is "yes" (has terminated), this processing terminates; if "no" (has not terminated), the process returns to step S503, and the above-described processing is repeated.

Figure 6:
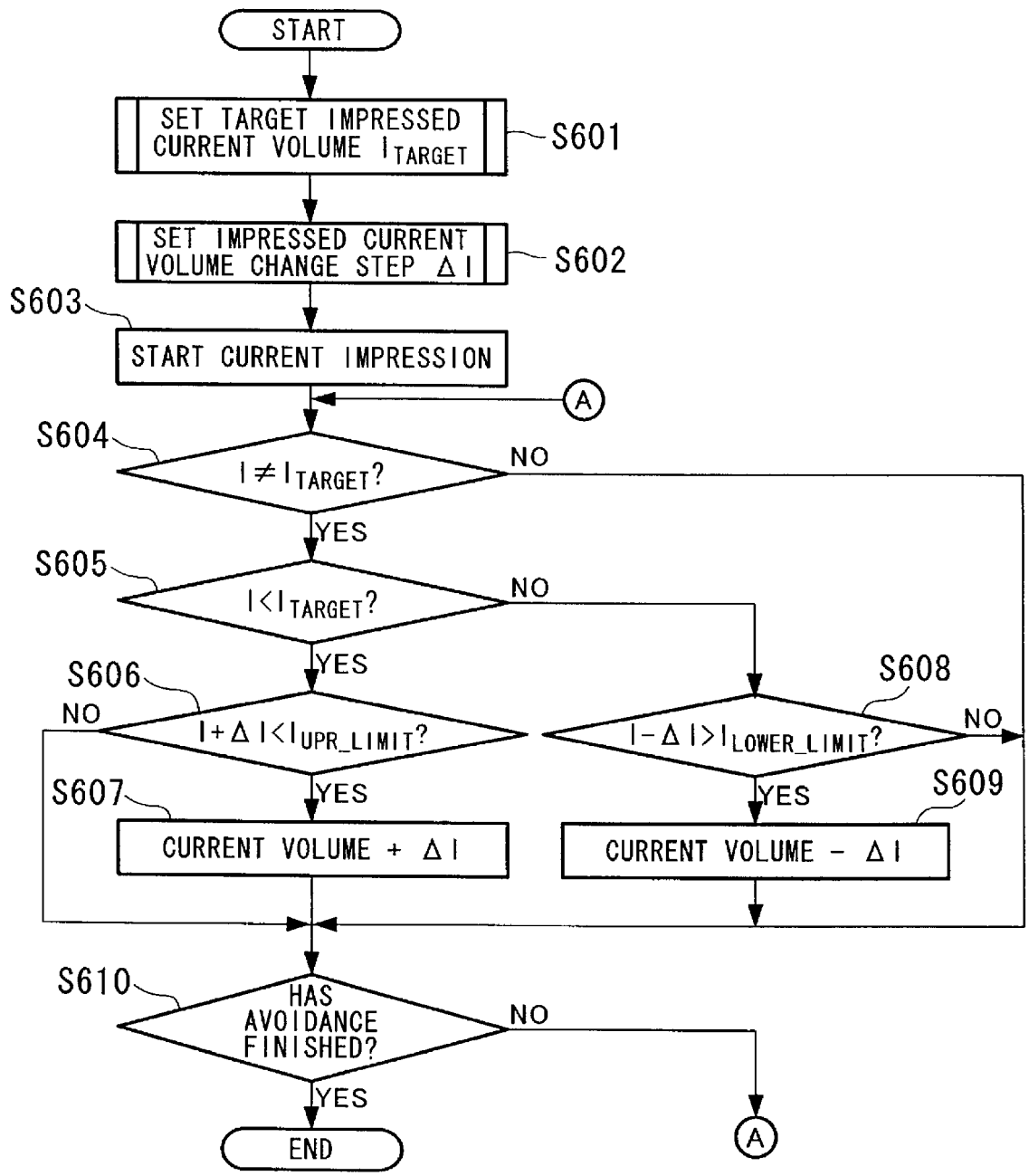
FIG. 6 is a flow chart of the second mode of FIG. 4.

Next, a description is given of the control processing in the second mode of the seat belt device 35 with reference to the flow chart of FIG. 6. As with the aforementioned flow chart of FIG. 5, this processing is processing which is conducted in parallel with the main flow of FIG. 4.

First, in step S601, processing is conducted which sets a target impressed current volume $I_{target}$, and the process proceeds to step S602.

In step S602, processing which sets a change step of the impressed current volume ΔI is conducted. In step S603, current begins to be impressed on the motor at the target impressed current volume.

In step S604, it is discriminated whether or not the current impressed current volume I of the motor 49 differs from the target impressed current volume $I_{target}$. If the discrimination result of step S604 is "yes" (I≠$I_{target}$), the process proceeds to step S605, if "no" (I=$I_{target}$), the process proceeds to step S610.

In step S605, it is discriminated whether or not the current impressed current volume I is smaller than the target impressed current volume $I_{target}$. If the discrimination result of step S605 is "yes" (I<$I_{target}$), the process proceeds to step S606, if "no" (I>$I_{target}$), the process proceeds to step S608.

In step S606, it is discriminated whether or not the value obtained by adding the change step ΔI to the current impressed current volume I is smaller than a preset upper-limit value of the impressed current volume $I_{upr\_limit}$. If the discrimination result of step S606 is "yes" (I+ΔI<$I_{upr\_limit}$), the process proceeds to step S607, if "no" (I+ΔI≧$I_{upr\_limit}$), the process proceeds to step S610.

In step S607, the change step ΔI is added to the current impressed current volume, and the process proceeds to step S610.

In step S608, it is discriminated whether or not the value obtained by subtracting the change step ΔI from the current impressed current volume I is larger than a preset lower-limit value of the impressed current volume $I_{lower\_limit}$. If the discrimination result of step S608 is "yes" (I−ΔI>$I_{lower\_limit}$), the process proceeds to step S609, if "no" (I−ΔI≦$I_{lower\_limit}$), the process proceeds to step S610.

In step S609, the change step ΔI is subtracted from the current impressed current volume I, and the process proceeds to step S610.

In step S610, it is discriminated whether or not the processing of step S417 of FIG. 4 has terminated. If the discrimination result of step S610 is "yes" (avoidance has terminated), this processing terminates; if "no" (has not terminated), the process returns to step S604, and the above-described processing is repeated.

With respect to the above-described control processing of the second mode, a description was given for the case where a target impressed current volume $I_{target}$ is set, and increase/decrease is conducted in stages at change step ΔI to this target impressed current volume $I_{target}$, but it is also possible to conduct setting so that a predetermined winding position X is reached as in the flow chart of FIG. 5.

However, in the case of this second mode, control of the motor 49 is conducted so that the winding position of the reel 51 is more advanced toward the winding side than the winding position of the first mode, and so that it is more advanced toward the winding side as road-surface μ increases.

With respect to the above-described control processing of the first mode, it is also possible to invoke the processing of the flow chart shown in FIG. 6, and to adopt a configuration which conducts control so that the motor 49 reaches the predetermined target impressed current volume $I_{target}$. However, in this case, the processing of step S610 of FIG. 6 is replaced with the processing of step S508, and the target impressed current volume $I_{target}$ in the first mode is set smaller than the target impressed current volume $I_{target}$ in the second mode.

Figure 7:
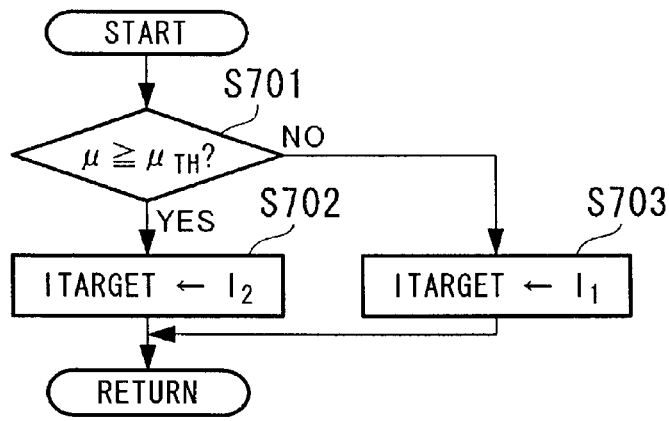
FIG. 7 is a flow chart of the processing which sets the target impressed current volume of FIG. 6.

Next, a detailed description is given of the processing for setting the target current $I_{target}$ of the aforementioned step S601 with reference to FIG. 7.

First, in step S701, it is discriminated whether or not road-surface μ is equal to or greater than the predetermined threshold $μ_{th}$. If the discrimination result of step S701 is "yes" ($μ \geq μ_{th}$), the process proceeds to step S702, if "no" ($μ < μ_{th}$), the process proceeds to step S703.

In step S702, a preset predetermined impressed current volume $I_2$ is set to the target impressed current volume $I_{target}$, this processing is terminated, and the flow returns to the parent process.

In step S703, a preset predetermined impressed current volume $I_1$ is set to the target impressed current volume $I_{target}$, this processing is terminated, and the flow returns to the parent process. With respect to the aforementioned impressed current volume $I_1$ and impressed current volume $I_2$, the volumes are set to be $I_1 < I_2$.

Figure 8:
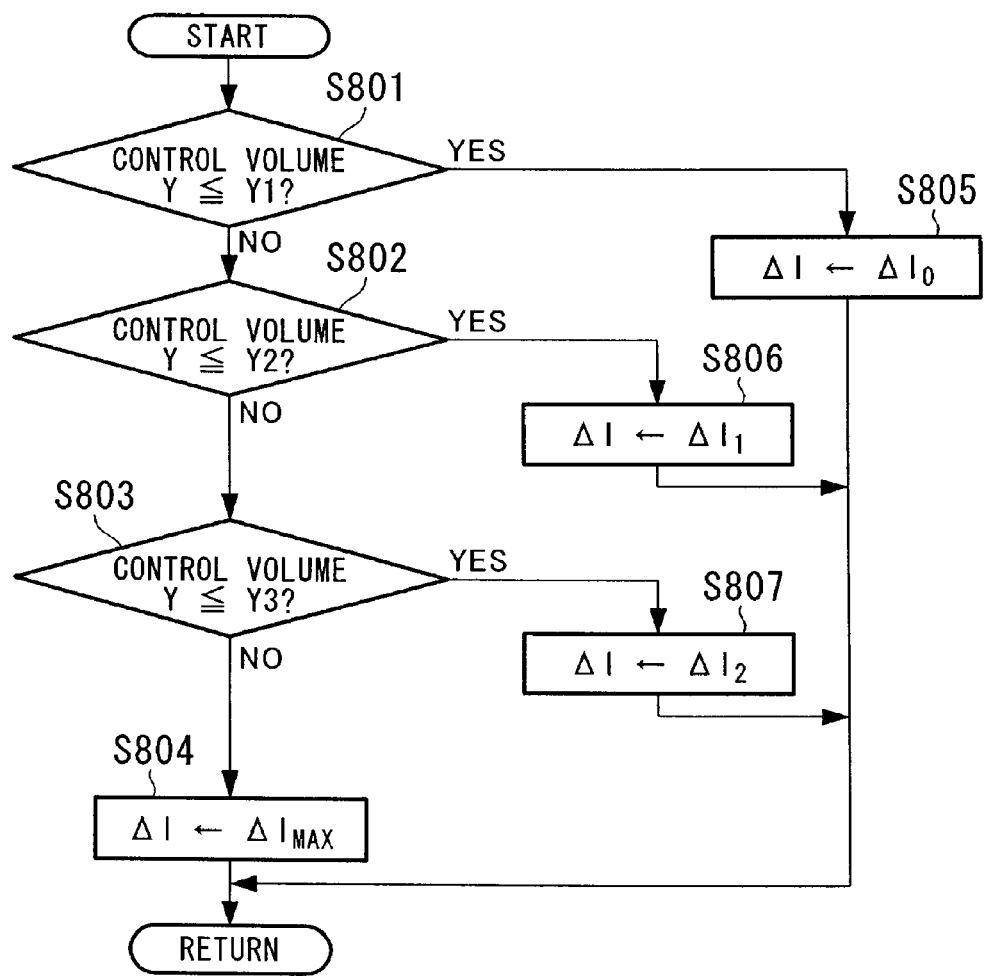
FIG. 8 is a flow chart of the processing which sets the change step of the impressed current volume of FIG. 6.

Next, a detailed description is given of the processing for setting the change step of the impressed current volume ΔI of the aforementioned step S602 with reference to FIG. 8.

In this processing, a comparison is made of the actual control volume Y and three predetermined control volumes constituting a relation of Y1<Y2<Y3, and the change step of the impressed current volume ΔI is set so that the change step ΔI grows larger as the control volume grows larger.

Here, the aforementioned control volume Y signifies a control volume controlled by the avoidance assist control of the braking controller 64 and the steering controller 69, and may use a target yaw moment during steering support or a target steering angle required to avoid an obstacle obtained based on the detection results of the obstacle detector 61.

First, in step S801, it is discriminated whether or not the control volume Y is at or below the predetermined control volume Y1. If the discrimination result of step S801 is "yes" ($Y \leq Y1$), the process proceeds to step S805, if "no" ($Y > Y1$), the process proceeds to step S802.

In step S802, it is discriminated whether or not the control volume Y is at or below the predetermined control volume Y2. If the discrimination result of step S802 is "yes" ($Y \leq Y2$), the process proceeds to step S806, if "no" ($Y > Y2$), the process proceeds to step S803.

In step S803, it is discriminated whether or not the control volume Y is at or below the predetermined control volume Y3. If the discrimination result of step S803 is "yes" ($Y \leq Y3$), the process proceeds to step S807, if "no" ($Y > Y3$), the process proceeds to step S804.

In step S804, a maximum value $ΔI_{max}$ is set at change step ΔI, and the flow returns to the parent process.

In step S805, a predetermined change step $ΔI_0$ is set at change step ΔI, and the flow returns to the parent process.

In step S806, a predetermined change step $ΔI_1$ is set at change step ΔI, and the flow returns to the parent process.

In step S807, a predetermined change step $ΔI_2$ is set at change step ΔI, and the flow returns to the parent process.

Here, the aforementioned change steps $ΔI_0$–$ΔI_2$ are respectively preset change steps, and stand in the relation of $ΔI_0 < ΔI_1 < ΔI_2 < ΔI_{max}$. With respect to the processing of the aforementioned FIG. 8, a description was given of the case where the change step ΔI is set in four stages, but it is not limited thereto, and it is more preferable as the number of setting stages increases. Moreover, it is also possible to continuously set the change step ΔI using a table or map of change steps according to control volumes Y.

That is, as shown by the timing chart of FIG. 11, parts (a) to (d), the aforementioned control device 110 actuates μ-estimation braking when the time to collision TTC is at a standard time in the case where the vehicle 100 is advancing in a linear manner. Here, the standard time is on the order of 2 seconds when the obstacle is a stationary object, and 4 to 6 seconds when the obstacle is a moving object. At this time, as shown in FIG. 11, part (d), control of the seat belt device 35 is conducted by the first mode in the posture maintenance interval of the timing chart.

When road-surface μ is calculated by the μ estimator 63, avoidance assist braking is conducted when the time to collision TTC is approximately 2.5 seconds, and vehicle speed is reduced using either one of the maps according to the case of high μ and the case of low μ, as shown in FIG. 11, part (b).

As shown in FIG. 11, part (d), simultaneous with the commencement of avoidance assist braking, control of the seat belt device 35 is conducted by the second mode as the variable-tension area. In this working example, the second mode is conducted as the variable-tension area at the same time as avoidance assist braking, but it is also possible to start the second mode immediately before the start of turning support after avoidance assist braking where the time to collision TTC is 1.8 seconds.

In the second mode, the impressed current volume of the motor 49 is gradually increased at a rate of increase corresponding to control volume Y until the target impressed current volume $I_{target}$, which is set higher when road-surface μ is high μ, as shown by the solid line in FIG. 11, part (d), than when it is low μ, as shown by the broken line in FIG. 11, part (d). At the point when the time to collision TTC is 1.8 seconds, control which inhibits excessive turning of the steering wheel 121 is conducted together with turning support. At the point when the time to collision TTC is 0 seconds, control which inhibits excessive turning of the steering wheel 121 is conducted together with support of return to the original travel path. At the point when the vehicle 100 has returned to the original travel path, control by the steering controller 69, braking controller 64 and seat belt controller 67 is returned to normal control. It should be noted that the aforementioned times to collision TTC are examples, and it is not limited thereto.

Thus, according to the above-described embodiment, when an obstacle to the front of the vehicle 100 is detected by the obstacle detector 61, the braking controller 64 and steering controller 69 conduct obstacle avoidance assist, and the seat belt controller 67 controls the current impressed on the motor 49 based on the condition of avoidance assist by the braking controller 64 and steering controller 69, whereby the reel 51 on which the webbing 41 is wound can be rotationally driven simultaneous with obstacle avoidance assist, and the tension of the webbing 41 can be adjusted. Consequently, during avoidance assist by the braking controller 64 and steering controller 69, it is possible to conduct natural restraining action without imparting a sense of discomfort to the passenger while maintaining restraint by the webbing 41, thereby enabling improvement of comfort.

In addition, the seat belt controller 67 can control the current volume impressed on the motor 49 in a first mode (commencing in step S403) when the braking controller 64 conducts the estimation (calculation) of road-surface μ of step S405, and can control the current volume impressed on the motor 49 in a second mode (commencing in step S411) when the turning support control of steps S411 to S417 are conducted. Consequently, it is possible to control the current volume impressed on the motor 49 in respectively optimal control modes when μ-estimation braking is conducted and when turning support control is conducted. Consequently, it is possible to prevent excessive restraint by the webbing 41, and to maintain passenger posture in the correct state while improving comfort.

Furthermore, when the braking controller 64 and steering controller 69, in order to cause the vehicle 100 to change course in the direction of obstacle avoidance, conduct individual control of the braking force of each wheel of the vehicle 100 and control the steering reaction force of the steering device 10 so that force is increased in the direction of obstacle avoidance, it is possible to control the current volume impressed on the motor 49 in a second mode (step S411), to optimize restraint by the webbing 41.

Furthermore, it is possible to set the target impressed current volume $I_{target}$ of the motor 49 according to road-surface μ. Consequently, the posture of the passenger 30 can be maintained without increasing the restraining force of the webbing 41 more than is necessary.

The seat belt controller 67 changes the current volume impressed on the motor 49 and the winding position of the webbing 41 by the reel 51 based on the control volume of the steering reaction force controlled by the steering controller 69, thereby enabling restraining force to be imparted by the webbing 41 according to the control volume of steering reaction force. As a result, it is possible to apply appropriate tension to the webbing 41 according to the posture change of the passenger 30. Consequently, it is possible to inhibit generation of unnecessary tension of the webbing 41, and to achieve further improvement of comfort.

This invention is not limited to the above-described embodiment, and in cases where the posture of the passenger 30 is a markedly forward-inclined posture or where the sitting posture is abnormal, it is possible to conduct control which conducts winding of a predetermined winding amount or to conduct drive control of the motor 49 at a predetermined impressed current volume after the webbing 41 has been wound in advance to a standard position, with the winding position of the reel 51 immediately after vehicle embarkation as the standard position.

In the foregoing embodiment, a description was given of the case where turning force is applied to the vehicle 100 by control conducted by both the braking controller 64 and steering controller 69, but it is also possible to apply turning force to the vehicle 100 using either one of these. Furthermore, in this case, it is also possible to apply control by the second mode of the aforementioned seat belt device 35.

For example, in the case where turning force is applied using only the braking controller 64, it is possible to conduct drive control of the motor 49 in the second mode when the braking force applied to each wheel of the vehicle 100 is being individually controlled, and when turning force is being applied while decelerating the vehicle 100. Consequently, it is possible to optimize restraint by the webbing 41 when turning force is supported by the braking controller 64.

On the other hand, in the case where turning force is applied using only the steering controller 69, it is possible to control steering reaction force so that force is increased in the direction of obstacle avoidance, and to apply turning force to the vehicle 100. Consequently, it is possible to conduct drive control of the motor 49 in the second mode and to optimize restraint by the webbing 41 when force is being increased in the direction of obstacle avoidance, and when turning force is being applied to the vehicle 100.

In the above-described embodiment, a description was given of the case where, in the second mode, the change step of the impressed current volume ΔI of the motor 49 is set based on the control volume Y, and where the impressed current volume is gradually increased toward the target impressed current volume $I_{target}$, but it is also possible to conduct drive control of the motor 49 as is using the target impressed current volume $I_{target}$.

While preferred embodiments of the invention have been described and illustrated above, it should be understood that these are exemplary of the invention and are not to be considered as limiting. Additions, omission, substitutions, and other modifications can be made without departing from the spirit or scope of the present invention. Accordingly, the invention is not to be considered as being limited by the foregoing description, and is only limited by the scope of the appended claims.

What is claimed is:

1. A vehicle seat-belt apparatus comprising:
a forward monitoring device which conducts monitoring to the front of a vehicle;
an avoidance assist device which supports a predetermined avoidance operation in order to avoid an obstacle when it is determined that there is an obstacle to be avoided based on a detection result of the forward monitoring device, the avoidance assist device including a linear braking device which imparts a predetermined braking force to the vehicle when the forward monitoring device detects the obstacle, and a turning-force support device which imparts a turning force to the vehicle;
a motor which conducts a rotary driving of a belt reel on which a belt is wound;
a control device which controls the motor;
a road-surface friction coefficient estimation device which estimates a friction coefficient of a road surface during the operation of the linear braking device;
a first control map of a vehicle speed in direct relation to the friction coefficient; and
a second control map of the vehicle speed in direct relation to the friction coefficient,
wherein
the control device conducts a drive control of the motor by a first control mode during an operation of the linear braking device, and conducts the drive control of the motor by a second control mode that differs from the first control mode during an operation of the turning-force support device,
during the first control mode, the control device selects the first control map when the friction coefficient is larger than a predetermined threshold value friction coefficient, and selects the second control map when the friction coefficient is smaller than the predetermined threshold value friction coefficient,
the control device increases or decreases a winding position of the belt reel or a current volume impressed on the motor based on the friction coefficient of the road-surface when the drive control is conducted by the second control mode, and the road-surface friction coefficient estimation device includes a brake controller that is constituted to perform a road-surface friction coefficient estimation braking, during the first control mode when the road-surface friction coefficient estimation is performed, the road-surface estimation braking is performed.

2. The vehicle seat-belt apparatus according to claim 1, wherein the control device increases a current volume impressed on the motor when the drive control is conducted by the second control mode above the current volume impressed in the first control mode.

3. The vehicle seat-belt apparatus according to claim 1, further comprising a rotation detection device which detects a rotational state of the belt reel, wherein:

the control device conducts the drive control of a current volume impressed on the motor so that the belt reel is held at a predetermined first winding position based on a detection result of the rotation detection device when the drive control is conducted by the first control mode; and the control device conducts the drive control of the current volume impressed on the motor so that the belt reel is held at a second winding position whose winding amount is greater than that of the first winding position based on the detection result of the rotation detection device when the drive control is conducted by the second control mode.

4. The vehicle seat-belt apparatus according to claim 1, further comprising a rotation detection device which detects a rotational state of the belt reel, wherein:

the control device controls a current volume impressed on the motor so that the belt reel is held at a predetermined winding position based on a detection result of the rotation detection device when the drive control is conducted by the first control mode; and the control device conducts the drive control of the motor at a predetermined impressed current volume when the drive control is conducted by the second control mode.

5. The vehicle seat-belt apparatus according to claim 1, wherein the turning-force support device imparts the turning force to the vehicle while decelerating the vehicle by individually controlling the braking force imparted to each wheel of the vehicle.

6. The vehicle seat-belt apparatus according to claim 1, wherein the turning-force support device imparts the turning force to the vehicle by imparting a steering reaction force to a steering device of the vehicle so that the obstacle is avoided.

7. The vehicle seat-belt apparatus according to claim 6, further comprising a steering control device which controls at least one of the steering angle or the steering reaction force of the steering device, wherein the control device varies a winding position of the belt reel or a current volume impressed on the motor, based on a control volume of the steering control device.

8. The vehicle seat-belt apparatus according to claim 1, wherein:

the turning-force support device imparts the turning force to the vehicle while decelerating the vehicle by individually controlling the braking force which is imparted to each wheel of the vehicle; and the turning-force support device imparts the turning force to the vehicle by imparting a steering reaction force to a steering device of the vehicle so that the steering reaction force is increased toward a direction in which a passenger conducts a steering operation, based on a detection result of a steering angle detection device which detects a steering angle operated by the passenger.

9. The vehicle seat-belt apparatus according to claim 8, further comprising a steering control device which controls at least one of the steering angle or the steering reaction force of the steering device, wherein the control device varies a winding position of the belt reel or a current volume impressed on the motor, based on a control volume of the steering control device.

10. The vehicle seat-belt apparatus according to claim 1, wherein when the control device selects the first control map, the avoidance assist device is started several hundred milliseconds after the friction coefficient has been calculated, and when the control device selects the second control map, the avoidance assist device is started immediately after the friction coefficient has been calculated.

11. The vehicle seat-belt apparatus according to claim 1, wherein the road-surface friction coefficient estimation device further includes a plurality of vehicle speed sensors that are constituted to detect a wheel speed difference between a driving wheel and a non-driving wheel, wherein the brake controller controls the non-driving wheel.

* * * * *